(12) United States Patent
Shibata et al.

(10) Patent No.: US 9,869,287 B2
(45) Date of Patent: Jan. 16, 2018

(54) SYSTEM AND METHOD FOR CONTROLLING FUEL INJECTION TIMING BASED ON SPARK IGNITION TIMING WHILE HEATING A CATALYST TO THE LIGHT-OFF TEMPERATURE

(71) Applicant: GM Global Technology Operations LLC, Detroit, MI (US)

(72) Inventors: Jonathan T. Shibata, Whitmore Lake, MI (US); Michael J. Lucido, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1031 days.

(21) Appl. No.: 14/152,307

(22) Filed: Jan. 10, 2014

(65) Prior Publication Data

US 2015/0144102 A1 May 28, 2015

Related U.S. Application Data

(60) Provisional application No. 61/908,924, filed on Nov. 26, 2013.

(51) Int. Cl.
*F02P 5/00* (2006.01)
*F02P 5/04* (2006.01)
(Continued)

(52) U.S. Cl.
CPC .............. *F02P 5/045* (2013.01); *F02D 37/02* (2013.01); *F02D 41/009* (2013.01); *F02D 41/0255* (2013.01); *F02P 5/1506* (2013.01); *F01N 2900/1602* (2013.01); *F02B 2075/125* (2013.01); *F02D 2041/389* (2013.01); *F02D 2200/0802* (2013.01); *Y02T 10/123* (2013.01); *Y02T 10/26* (2013.01); *Y02T 10/46* (2013.01)

(58) Field of Classification Search
CPC ......... F02P 5/045; F02P 5/1506; F02D 37/02; F02D 41/009; F02D 41/0255; F02D 2041/389; F02D 2200/0802; Y02T 10/26; Y02T 10/123; Y02T 10/46; F01N 2900/1602; F02B 2075/125
See application file for complete search history.

(56) References Cited

U.S. PATENT DOCUMENTS 5,642,705 A * 7/1997 Morikawa ............. F02B 17/005
123/300
5,715,794 A * 2/1998 Nakamura ............... F02D 21/08
123/305

(Continued)

FOREIGN PATENT DOCUMENTS

CN 1279342 A 1/2001

*Primary Examiner* — Hung Q Nguyen

(57) ABSTRACT

A system according to the principles of the present disclosure includes an ignition timing determination module, an injection timing determination module, a spark control module, and a fuel control module. The ignition timing determination module determines a first crank angle. The injection timing determination module selectively determines a second crank angle based on the first crank angle. The spark control module controls a spark plug to generate spark in a cylinder of an engine at the first crank angle. The fuel control module controls a fuel injector to deliver fuel to the cylinder at the second crank angle.

20 Claims, 4 Drawing Sheets

(51) Int. Cl.
*F02D 41/00* (2006.01)
*F02D 41/02* (2006.01)
*F02P 5/15* (2006.01)
*F02D 37/02* (2006.01)
F02B 75/12 (2006.01)
F02D 41/38 (2006.01)

(56) References Cited

U.S. PATENT DOCUMENTS

| | | | | |
|---|---|---|---|---|
| 5,894,724 A | * | 4/1999 | Minowa | F02D 41/024 60/274 |
| 6,318,074 B1 | * | 11/2001 | Nishimura | F02D 41/024 60/284 |
| 2007/0012290 A1 | * | 1/2007 | Yamaguchi | F02D 35/023 123/406.47 |

* cited by examiner

SYSTEM AND METHOD FOR CONTROLLING FUEL INJECTION TIMING BASED ON SPARK IGNITION TIMING WHILE HEATING A CATALYST TO THE LIGHT-OFF TEMPERATURE

CROSS-REFERENCE TO RELATED APPLICATIONS

This application claims the benefit of U.S. Provisional Application No. 61/908,924, filed on Nov. 26, 2013. The disclosure of the above application is incorporated herein by reference in its entirety.

FIELD

The present disclosure relates to internal combustion engines, and more specifically, to systems and methods for controlling fuel injection timing based on spark ignition timing while heating a catalyst to the light-off temperature.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes an ignition timing determination module, an injection timing determination module, a spark control module, and a fuel control module. The ignition timing determination module determines a first crank angle. The injection timing determination module selectively determines a second crank angle based on the first crank angle. The spark control module controls a spark plug to generate spark in a cylinder of an engine at the first crank angle. The fuel control module controls a fuel injector to deliver fuel to the cylinder at the second crank angle.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

When an engine is initially started, exhaust gas produced by the engine may be used to heat a catalyst in an exhaust system of the engine to its light-off temperature. To increase the temperature of the exhaust gas and thereby increase the rate at which the catalyst is heated to its light-off temperature, the spark ignition timing and the fuel injection timing of the engine may be retarded relative to their normal operating values. If fuel is injected into a cylinder of an engine at a time when a piston in the cylinder is at top dead center, the fuel may be sprayed directly on the piston, which may increase the amount of particulates (e.g., unburned fuel) emitted from the exhaust system.

To prevent injection of fuel when the piston is at top dead center, a system and method according to the present disclosure determines whether the spark ignition timing is retarded beyond a spark timing limit (e.g., 10 degrees after top dead center). When the spark ignition timing is retarded beyond the spark timing limit, the system and method controls the fuel injection timing based on the spark ignition timing. For example, the fuel injection timing may be offset relative to the spark ignition timing by a predetermined amount (e.g., 3 degrees). Controlling the fuel injection timing based on the spark ignition timing may further increase the temperature of exhaust gas, which may reduce the amount of time required to heat the catalyst to its light-off temperature.

Figure 1:
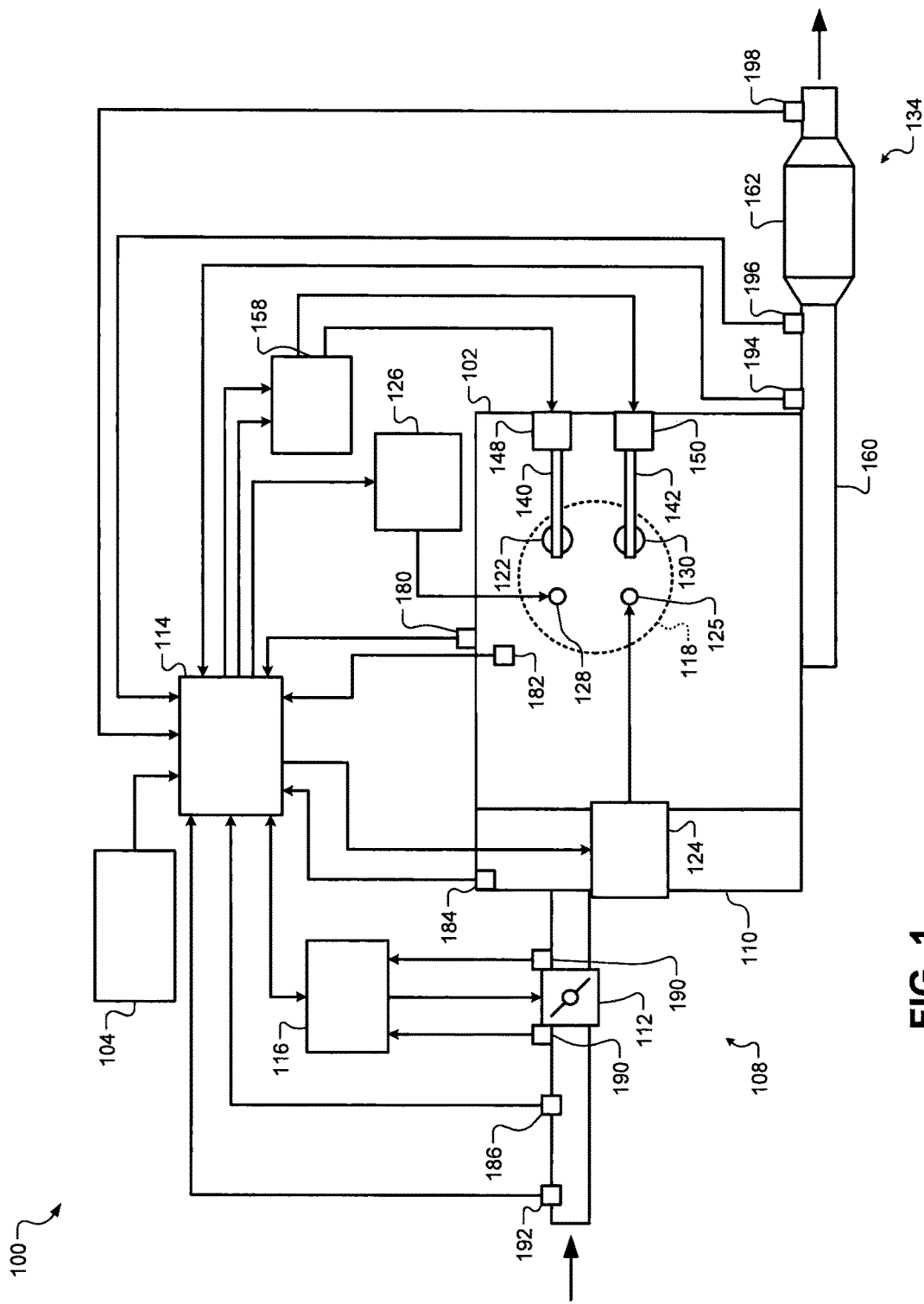
FIG. 1 is a functional block diagram of an example engine system according to the principles of the present disclosure.

Referring now to FIG. 1, an engine system 100 includes an engine 102 that combusts an air/fuel mixture to produce drive torque for a vehicle. The amount of drive torque produced by the engine 102 is based on a driver input from a driver input module 104. The driver input may be based on a position of an accelerator pedal. The driver input may also be based on a cruise control system, which may be an adaptive cruise control system that varies vehicle speed to maintain a predetermined following distance. In addition, the driver input may be based on the position of an ignition switch (not shown), and the engine 102 may be started based on the driver input.

Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM)

114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates the amount of fuel injected by a fuel injector 125 to achieve a desired air/fuel ratio. The fuel injector 125 may inject fuel into the intake manifold 110 at a central location or at multiple locations, such as near the intake valve 122 of each of the cylinders. In various implementations, the fuel injector 125 may inject fuel directly into the cylinders or into mixing chambers associated with the cylinders. The fuel actuator module 124 may halt delivery of fuel to cylinders that are deactive.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 to generate a spark in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactive cylinders.

Generating the spark may be referred to as a firing event. The spark actuator module 126 may have the ability to vary the spark timing for each firing event. The spark actuator module 126 may even be capable of varying the spark timing for a next firing event when the spark timing signal is changed between a last firing event and the next firing event. In various implementations, the engine 102 may include multiple cylinders and the spark actuator module 126 may vary the spark timing relative to TDC by the same amount for all cylinders in the engine 102.

During the combustion stroke, combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The time at which the intake valve 122 is opened may be varied with respect to piston TDC by an intake cam phaser 148. The time at which the exhaust valve 130 is opened may be varied with respect to piston TDC by an exhaust cam phaser 150. A valve actuator module 158 may control the intake and exhaust cam phasers 148, 150 based on signals from the ECM 114. When implemented, variable valve lift may also be controlled by the valve actuator module 158.

The valve actuator module 158 may deactivate the cylinder 118 by disabling opening of the intake valve 122 and/or the exhaust valve 130. The valve actuator module 158 may disable opening of the intake valve 122 by decoupling the intake valve 122 from the intake cam phaser 148. Similarly, the valve actuator module 158 may disable opening of the exhaust valve 130 by decoupling the exhaust valve 130 from the exhaust cam phaser 150. In various implementations, the valve actuator module 158 may control the intake valve 122 and/or the exhaust valve 130 using devices other than camshafts, such as electromagnetic or electrohydraulic actuators.

The exhaust system 134 includes an exhaust manifold 160 and a catalytic converter 162 containing a catalyst. The exhaust manifold 160 directs exhaust gas from the engine 102 to the catalytic converter 162, which reduces emissions in the exhaust gas. The catalytic converter 162 may be a three-way catalytic converter that reduces nitrogen oxide, carbon monoxide, and hydrocarbon. The catalytic converter 162 may reduce nitrogen oxide to nitrogen and oxygen, oxidize carbon monoxide to carbon dioxide, and oxidize hydrocarbon to carbon dioxide and water. Additionally, the catalytic converter 162 may release oxygen when the engine 102 is operated at a rich air/fuel ratio and may store oxygen when the engine 102 is operated at a lean air/fuel ratio.

The engine system 100 may measure the position of the crankshaft using a crankshaft position (CKP) sensor 180. The temperature of the engine coolant may be measured using an engine coolant temperature (ECT) sensor 182. The ECT sensor 182 may be located within the engine 102 or at other locations where the coolant is circulated, such as a radiator (not shown).

The pressure within the intake manifold 110 may be measured using a manifold absolute pressure (MAP) sensor 184. In various implementations, engine vacuum, which is the difference between ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The temperature of exhaust gas expelled from the engine 102 may be measured using an exhaust gas temperature (EGT) sensor 194. The oxygen level upstream from the catalytic converter 162 may be measured using a first oxygen (O2) sensor 196. The oxygen level downstream from the catalytic converter 162 may be measured using a second oxygen (O2) sensor 198. The ECM 114 may use signals from the sensors to make control decisions for the engine system 100.

Figure 2:
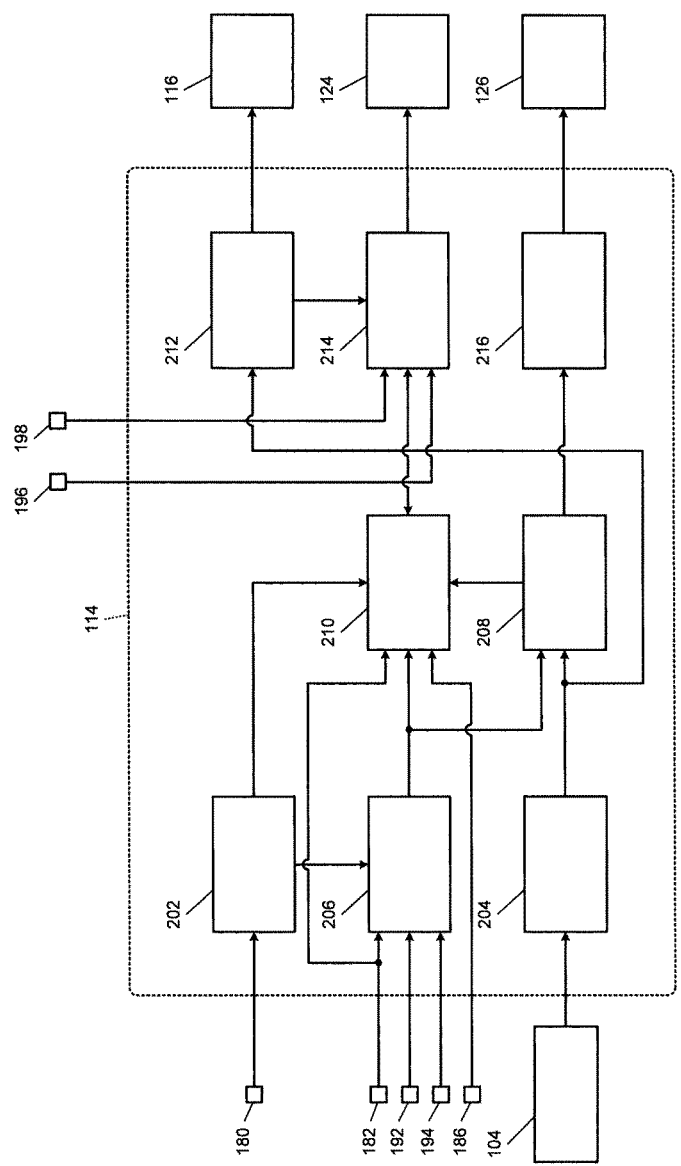
FIG. 2 is a functional block diagram of an example control system according to the principles of the present disclosure.

Referring now to FIG. 2, an example implementation of the ECM 114 includes an engine speed determination module 202. The engine speed determination module 202 determines engine speed. The engine speed determination module 202 may determine the engine speed based on the crankshaft position from the CKP sensor 180. For example, the engine speed determination module 202 may determine the engine speed based on a period of crankshaft rotation corresponding to a number of tooth detections. The engine speed determination module 202 outputs the engine speed.

A driver torque request module 204 determines a driver torque request based on the driver input from the driver input module 104. The driver torque request module 204 may store one or more mappings of accelerator pedal position to desired torque, and may determine the driver torque request based on a selected one of the mappings. The driver torque request module 204 outputs the driver torque request.

A mode activation module 206 activates one of a plurality of operating modes associated with fuel injection timing and spark ignition timing. The operating modes may include a cranking mode, a catalyst light-off mode, and a normal operating mode. The mode activation module 206 activates the cranking mode when the engine 102 is cranking. The mode activation module 206 may determine that the engine 102 is cranking when the engine speed is less than a predetermined speed.

The mode activation module 206 activates the catalyst light-off mode when the engine 102 is running and the temperature of the catalyst is less than its light-off temperature. The mode activation module 206 may determine that the engine 102 is running when the engine speed is greater than or equal to the predetermined speed. The light-off temperature of the catalyst may be predetermined. The mode activation module 206 may determine whether the catalyst has reached its light-off temperature based on the engine coolant temperature from the ECT sensor 182. For example, the mode activation module 206 may determine that the catalyst temperature is less than its light-off temperature when the engine coolant temperature is less than a predetermined temperature.

The mode activation module 206 activates the normal operating mode when the engine 102 is running and the catalyst temperature is greater than or equal to its light-off temperature. The mode activation module 206 may estimate the catalyst temperature based on the engine coolant temperature, the intake air temperature from the IAT sensor 192, and/or an engine oil temperature. Additionally or alternatively, the mode activation module 206 may estimate the catalyst temperature based on the exhaust gas temperature from the EGT sensor 194.

An ignition timing determination module 208 determines a crank angle at which to generate spark in the cylinder 118, which may be referred to as a spark angle. The spark angle may be specified in number of degrees before the piston in the cylinder 118 reaches top dead center. The ignition timing determination module 208 may determine the spark angle based on the driver torque request. The ignition timing determination module 208 may retard the spark timing (e.g., decrease the spark angle) when the catalyst light-off mode is active relative to when the normal operating mode is active.

An injection timing determination module 210 determines a crank angle at which to start injecting fuel into the cylinder 118 or into a mixing chamber associated with the cylinder 118. The crank angle determined by the injection timing determination module 210 may be referred to as a start of injection (SOI) angle. The injection timing determination module 210 may determine the SOI angle using one or more lookup tables that map various engine operating conditions to the SOI angle. The lookup table used by the injection timing determination module 210 may depend on which operating mode is active. For example, the lookup tables may include a cranking mode table, a light-off mode table, and a normal operating table.

When the cranking mode is active, the injection timing determination module 210 may determine the SOI angle based on the engine coolant temperature and/or a pressure of fuel provided to the fuel injector 125. In one example, a single fuel pulse may be injected into the cylinder 118 for each combustion event, and the injection timing determination module 210 may set the SOI angle of the injection pulse equal to 300 degrees before TDC. When the normal operating mode is active, the injection timing determination module 210 may determine the SOI angle based on the engine speed, the mass flow rate of intake air from the MAF sensor 186, and/or the fuel pressure. In one example, a single fuel pulse may be injected into the cylinder 118 for each combustion event, and the injection timing determination module 210 may set the SOI angle of the fuel injection pulse equal to 250 degrees before TDC.

When the catalyst light-off mode is active, the injection timing determination module 210 may compare the spark angle to a spark timing limit. The spark timing limit may be a predetermined angle (e.g., 10 degrees after TDC). If the spark angle is greater than or equal to the spark timing limit, the injection timing determination module 210 may determine the SOI angle based on the engine speed, the mass flow rate from the MAF sensor 186, and/or the fuel pressure. In one example, multiple fuel pulses may be injected into the cylinder 118 for each combustion event, and the injection timing determination module 210 may set the SOI angle of the second or subsequent fuel injection pulse equal to 40 degrees before TDC.

If the spark angle is less than the spark timing limit, the injection timing determination module 210 may determine the SOI angle based on the spark angle. For example, the injection timing determination module 210 may offset the SOI angle of the second or subsequent pulse relative to the spark angle by a predetermined amount (e.g., 3 degrees). In turn, fuel may be delivered to the cylinder 118 just before spark is generated in the cylinder 118, which may generate more heat relative to determining the SOI angle independent from the spark angle. The spark timing limit may be selected to ensure that determining the SOI angle based on the spark angle does not cause fuel to be injected when the piston in the cylinder 118 is at or near TDC, which prevents fuel spray directly on the piston.

A throttle control module 212 generates a throttle control signal, and the throttle actuator module 116 controls the throttle valve 112 based on the throttle control signal. The throttle control signal may indicate a desired throttle area and/or a desired throttle position. The throttle control module 212 may determine the desired throttle area and/or the desired throttle position based on the driver torque request.

A fuel control module 214 generates a fuel control signal, and the fuel actuator module 124 controls the fuel injector 125 based on the fuel control signal. The fuel control signal may indicate the timing for each fuel injection (e.g., the SOI angle) and an injection pulse width. The fuel control module 214 receives the fuel injection timing from the injection timing determination module 210. The fuel control module 214 may control whether one or more fuel injection pulses are delivered to the cylinder 118 for each combustion event, and the injection timing determination module 210 may output the fuel injection timing for each fuel injection pulse.

The fuel control module 214 may determine the pulse width based on the fuel pressure and a desired amount of fuel to be delivered to the cylinder 118 during each injection. The fuel control module 214 may adjust the amount of fuel delivered to the cylinder 118 to achieve a desired air/fuel ratio such as a stoichiometric air/fuel ratio. The pulse width may be specified as a number of degrees of crankshaft rotation.

A spark control module 216 generates a spark control signal, and the spark actuator module 126 controls the spark plug 128 based on the spark control signal. The fuel control signal may indicate the spark ignition timing (e.g., the spark angle). The spark control module 216 receives the spark ignition timing from the ignition timing determination module 208.

Figure 3:
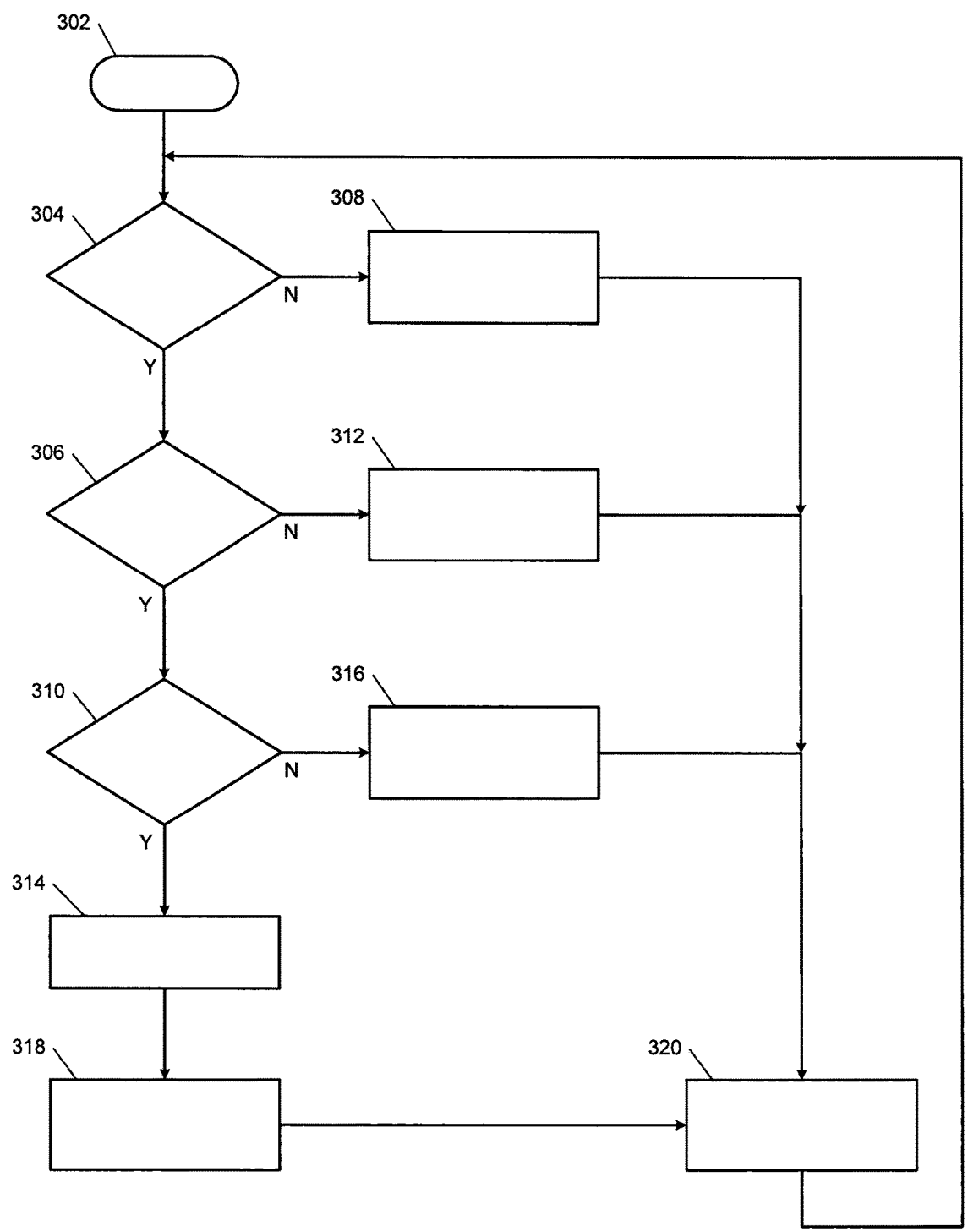
FIG. 3 is a flowchart illustrating an example control method according to the principles of the present disclosure.

Referring now to FIG. 3, a method for controlling fuel injection timing based on spark ignition timing while heating a catalyst to its light-off temperature begins at 302. At 304, the method determines whether engine cranking is complete (i.e., whether an engine has transitioned from cranking to running). The method may determine that engine cranking is complete when engine speed is greater than or equal to a predetermined speed. If engine cranking is complete, the method continues at 306. Otherwise, the method continues at 308.

At 308, the method determines the SOI angle using a cranking mode table. The cranking mode table may be a lookup table that maps engine coolant temperature and fuel pressure to the SOI angle. In one example, a single fuel pulse may be injected into a cylinder for each combustion event in the cylinder, and the method may set the SOI angle of the injection pulse equal to 300 degrees before TDC.

At 306, the method determines whether the catalyst light-off mode is active. The method activates the catalyst light-off mode when engine cranking is complete and the catalyst temperature is less than its light-off temperature. If the catalyst light-off mode is active, the method continues at 310. Otherwise, the method continues at 312.

When engine cranking is complete, the method may determine whether the catalyst has reached its light-off temperature based on the engine coolant temperature. For example, the method may determine that the catalyst temperature is less than its light-off temperature when the engine coolant temperature is less than a predetermined temperature. In addition, the method may estimate the catalyst temperature and, when the catalyst light-off mode is active, the method may determine whether the catalyst has reached its light-off temperature based on the estimated catalyst temperature. The method may estimate the catalyst temperature based on engine coolant temperature, intake air temperature, engine oil temperature, and/or exhaust gas temperature.

At 312, the method determines the SOI angle using a normal operating mode table. The normal operating mode table may be a lookup table that maps engine speed, intake airflow, and fuel pressure to the SOI angle. In one example, a single fuel pulse may be injected into a cylinder of the engine for each combustion event in the cylinder, and the method may set the SOI angle of the injection pulse equal to 250 degrees before TDC.

At 310, the method determines whether the spark angle is less than a spark timing limit (e.g., 10 degrees after top dead center). The spark timing limit may be selected to ensure that determining the SOI angle based on the spark angle does not cause fuel to be injected when a piston of the engine is at or near TDC, which prevents fuel spray directly on the piston. If the spark angle is less than the spark timing limit, the method continues at 314. Otherwise, the method continues at 316.

At 316, the method determines the SOI angle using a catalyst light-off (CLO) mode table. The CLO mode table may be a lookup table that maps engine speed, intake mass airflow, and fuel pressure to the SOI angle. In one example, multiple fuel pulses may be injected into a cylinder of the engine for each combustion event in the cylinder, and the method may set the SOI angle of the second or subsequent pulse equal to 40 degrees before TDC.

At 314, the method determines the spark angle. The method may determine the spark angle based on an amount of torque desired by a driver. The method may retard the spark timing (e.g., decrease the spark angle) when the catalyst light-off mode is active relative to the spark timing during normal operation of the engine.

At 318, the method determines the SOI angle of a fuel injection pulse into the cylinder based on the spark angle. For example, the method may offset the SOI angle of the second or subsequent pulse relative to the spark angle by a predetermined amount (e.g., 3 degrees). In turn, fuel may be delivered to the cylinder just before spark is generated in the cylinder, which may generate more heat relative to determining the SOI angle independent from the spark angle. At 320, the method controls a fuel injector associated with the cylinder based on the SOI angle. The method may also control a spark plug associated with the cylinder based on the spark angle.

Figure 4:
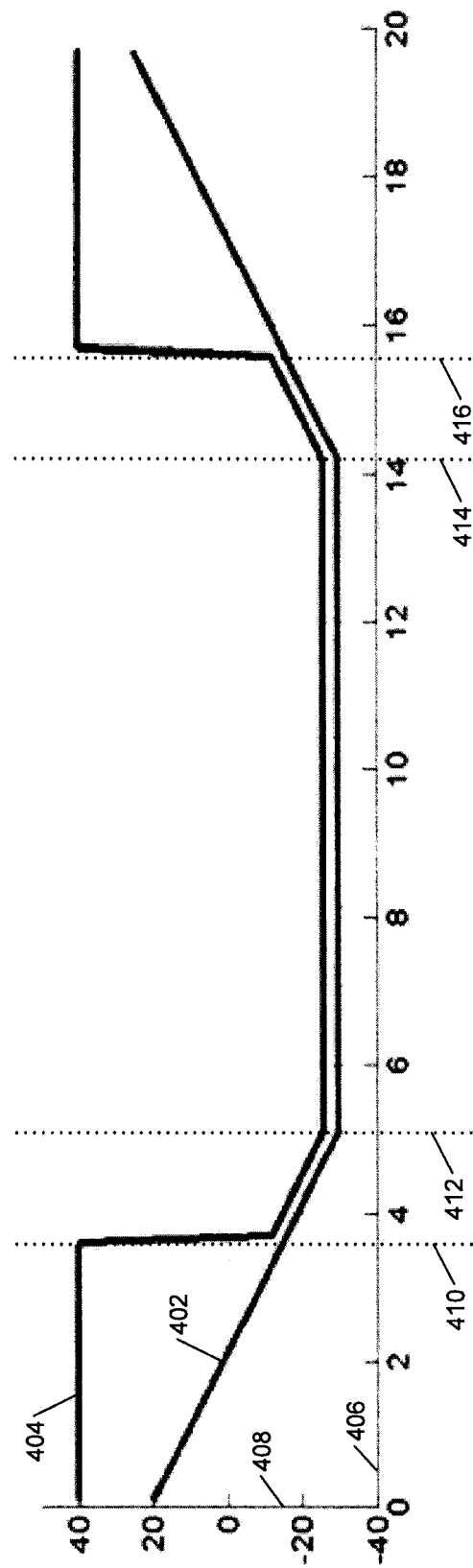
FIG. 4 is a graph illustrating an example spark ignition timing signal and an example fuel injection timing signal according to the principles of the present disclosure.

Referring now to FIG. 4, an example spark angle signal is illustrated at 402 and an example SOI angle signal is illustrated at 404. The spark and SOI angle signals 402, 404 may be generated by a system and method according to the present disclosure. The spark and SOI angle signals 402, 404 are plotted with respect to an x-axis 406 that represents time in seconds and a y-axis 408 that represents a number of degrees before TDC.

At a time of 0 seconds, the catalyst light-off mode is active. As a result, the spark angle signal 402 is gradually decreased to retard spark timing and thereby generate more heat to increase the rate at which a catalyst in an exhaust system of an engine is heated to its catalyst temperature. In addition, multiple fuel pulses may be injected into a cylinder of the engine for each combustion event, and the timing of the second or subsequent injection pulse may be retarded relative to normal injection timing to generate more heat. In this regard, the SOI angle signal 404 corresponds to the second or subsequent injection pulse and is initially maintained at 40 degrees before TDC, while the SOI angle during normal operation may be 250 degrees before TDC.

At 410, the spark angle signal 402 is less than a spark timing limit (e.g., −10 degrees before TDC). In response, the SOI angle signal 404 is instantaneously decreased (e.g., decreased between two combustion events) from 40 degrees before TDC to a first angle. The first angle is offset by a predetermined amount (e.g., 3 degrees) relative to the spark angle signal 402. During the period from 410 to 412, the spark angle signal 402 is gradually decreased over a plurality of combustion events, and the SOI angle signal 404 is decreased at the same rate to maintain the predetermined offset between the two signals.

At 412, the system and method stops decreasing the spark angle signal 402 to avoid causing combustion instability. Thus, the spark angle signal 402 is maintained at about 30 degrees before TDC, and the SOI angle signal 404 is maintained at an SOI angle that is offset by the predetermined amount relative to the spark angle signal 402. The spark and SOI angle signals 402, 404 may be maintained at their respective values until the catalyst reaches its light-off temperature.

At 414, the catalyst reaches its light-off temperature. During the period from 414 to 416, the spark angle signal 402 is gradually increased over a plurality of combustion events, and the SOI angle signal 404 is increased at the same rate to maintain the predetermined offset between the two signals. At 416, the SOI angle is greater than or equal to the spark timing limit. In response, the SOI angle signal 404 is instantaneously increased to 40 degrees before TDC and is maintained at 40 degrees before TDC as the spark angle signal 402 continues to gradually increase.

While the examples above discuss controlling fuel injection timing based on spark ignition timing while heating a catalyst to the light-off temperature, a system and method according to the present disclosure may operate similarly in other operating modes. In general, the system and method may be used in operating modes that increase the temperature of exhaust gas. For example, the system and method may be used in a gasoline particulate filter regeneration mode in which the temperature of exhaust gas is increased to combust particulate in a particulate filter and thereby regenerate the particulate filter.

In addition, the system and method may generate multiple (e.g., 5) sparks in succession for a single combustion event. In one example, the system and method specifies a spark angle of a main spark event (e.g., the first spark) and a period between each successive spark event. In this case, the system and method may offset the SOI angle relative to the spark angle of the main spark event when the spark angle of the main spark event is less than the spark timing limit.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

In this application, including the definitions below, the term module may be replaced with the term circuit. The term module may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term code, as used above, may include software, firmware, and/or microcode, and may refer to programs, routines, functions, classes, and/or objects. The term shared processor encompasses a single processor that executes some or all code from multiple modules. The term group processor encompasses a processor that, in combination with additional processors, executes some or all code from one or more modules. The term shared memory encompasses a single memory that stores some or all code from multiple modules. The term group memory encompasses a memory that, in combination with additional memories, stores some or all code from one or more modules. The term memory may be a subset of the term computer-readable medium. The term computer-readable medium does not encompass transitory electrical and electromagnetic signals propagating through a medium, and may therefore be considered tangible and non-transitory. Non-limiting examples of a non-transitory tangible computer readable medium include nonvolatile memory, volatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

What is claimed is:

1. A system comprising:
an ignition timing determination module that determines a first crank angle;
an injection timing determination module that selectively determines a second crank angle based on the first crank angle;
a spark control module that controls a spark plug to generate spark in a cylinder of an engine at the first crank angle; and
an fuel control module that controls a fuel injector to deliver fuel to the cylinder at the second crank angle.

2. The system of claim 1 wherein the injection timing determination module selectively determines the second crank angle based on the first crank angle when a temperature of a catalyst in an exhaust system of the engine is less than an activation temperature.

3. The system of claim 2 wherein the injection timing determination module determines the second crank angle based on the first crank angle when the catalyst temperature is less than the activation temperature and the first crank angle is less than a predetermined angle.

4. The system of claim 3 wherein the predetermined angle corresponds to a time after a piston in the cylinder is at top dead center.

5. The system of claim 3 wherein the injection timing determination module determines the second crank angle based on the first crank angle by offsetting the second crank angle relative to the first crank angle by a predetermined amount.

6. The system of claim 5 wherein the injection timing determination module offsets the second crank angle relative to the first crank angle by the predetermined amount such that fuel is delivered to the cylinder before spark is generated in the cylinder.

7. The system of claim 3 wherein:
the ignition timing determination module decreases the first crank angle over M combustion events in the cylinder during a first period; and
the injection timing determination module decreases the second crank angle over the M combustion events based on the decrease in the first crank angle over the M combustion events, wherein M is an integer greater than one.

8. The system of claim 7 wherein:
the ignition timing determination module increases the first crank angle over N combustion events in the cylinder during a second period that is after the first period; and
the injection timing determination module increases the second crank angle over the N combustion events based on the increase in the first crank angle over the N combustion events, wherein N is an integer greater than one.

9. The system of claim 8 wherein the ignition timing determination module increases the first crank angle and the injection timing determination module increases the second crank angle when the catalyst temperature is greater than or equal to the activation temperature.

10. The system of claim 8 wherein the injection timing determination module stops determining the second crank angle based on the first crank angle when the first crank angle is greater than or equal to the predetermined angle.

11. A method comprising:
determining a first crank angle;
selectively determining a second crank angle based on the first crank angle;
controlling a spark plug to generate spark in a cylinder of an engine at the first crank angle; and
controlling a fuel injector to deliver fuel to the cylinder at the second crank angle.

12. The method of claim 11 further comprising selectively determining the second crank angle based on the first crank angle when a temperature of a catalyst in an exhaust system of the engine is less than an activation temperature.

13. The method of claim 12 further comprising determining the second crank angle based on the first crank angle when the catalyst temperature is less than the activation temperature and the first crank angle is less than a predetermined angle.

14. The method of claim 13 wherein the predetermined angle corresponds to a time after a piston in the cylinder is at top dead center.

15. The method of claim 13 further comprising determining the second crank angle based on the first crank angle by offsetting the second crank angle relative to the first crank angle by a predetermined amount.

16. The method of claim 15 further comprising offsetting the second crank angle relative to the first crank angle by the predetermined amount such that fuel is delivered to the cylinder before spark is generated in the cylinder.

17. The method of claim 13 further comprising:
decreasing the first crank angle over M combustion events in the cylinder during a first period; and
decreasing the second crank angle over the M combustion events based on the decrease in the first crank angle over the M combustion events, wherein M is an integer greater than one.

18. The method of claim 17 further comprising:
increasing the first crank angle over N combustion events in the cylinder during a second period that is after the first period; and
increasing the second crank angle over the N combustion events based on the increase in the first crank angle over the N combustion events, wherein N is an integer greater than one.

19. The method of claim 18 further comprising increasing the first crank angle and the second crank angle when the catalyst temperature is greater than or equal to the activation temperature.

20. The method of claim 18 further comprising ceasing to determine the second crank angle based on the first crank angle when the first crank angle is greater than or equal to the predetermined angle.

\* \* \* \* \*